(12) United States Patent  (10) Patent No.: US 6,705,811 B1
Selby  (45) Date of Patent: Mar. 16, 2004

(54) SOFT LOOP TIE-DOWN ASSEMBLY

(75) Inventor: Ricky W. Selby, Danielson, CT (US)

(73) Assignee: Keeper Corporation, North Windham, CT (US)

( * ) Notice: Subject to any disclaimer, the term of this patent is extended or adjusted under 35 U.S.C. 154(b) by 0 days.

(21) Appl. No.: 10/335,353

(22) Filed: Dec. 31, 2002

(51) Int. Cl.⁷ .................................................. B60P 7/08
(52) U.S. Cl. .............................. 410/3; 410/7; 410/12; 410/23; 410/100
(58) Field of Search ................. 410/2, 3, 4, 7, 410/10, 11, 12, 23, 97, 100, 103, 116; 24/68 CD, 69 ST, 69 CT, 71 ST, 68 E, 302; 224/534, 568; 248/499

(56) References Cited

U.S. PATENT DOCUMENTS

| 4,358,232 | A | * | 11/1982 | Griffith | 410/100 |
| 4,842,458 | A | * | 6/1989 | Carpenter | 410/3 |
| 5,326,202 | A | * | 7/1994 | Stubbs | 410/3 |
| 5,423,644 | A | * | 6/1995 | First, Sr. | 410/100 |
| 5,529,448 | A | * | 6/1996 | Kosma | 410/97 |
| 5,908,274 | A | * | 6/1999 | Silberman | 410/10 |
| 6,065,914 | A | * | 5/2000 | Fotou | 410/3 |
| 6,171,034 | B1 | * | 1/2001 | Burgoon et al. | 410/3 |
| 6,524,041 | B1 | * | 2/2003 | Voiculescu | 410/100 |
| 2003/0059269 | A1 | * | 3/2003 | Bosley | 410/100 |
| 2003/0103831 | A1 | * | 6/2003 | Alderman | 410/100 |
| 2003/0152436 | A1 | * | 8/2003 | Trauthwein | 410/97 |

* cited by examiner

*Primary Examiner*—Stephen T. Gordon
(74) *Attorney, Agent, or Firm*—M. P. Williams

(57) ABSTRACT

A tie-down (9, 38) includes two straps (12, 21) with hooks (17, 24) secured to their ends, the other end (29) of a first strap (21) being workable with a buckle (15, 39) to provide tension. The buckle is captured in a loop (13) formed in the second strap (12), along with a soft loop (10), into which the hook (17) can be engaged so as to avoid damaging an article being restrained by the tie-down. The soft loop (10) is fashioned by stitching (33) of three contiguous layers of strap in a region (32) between the two loops, adjacent to the buckle; the stitching being perpendicular to the direction of tension (35) in the strap.

7 Claims, 2 Drawing Sheets

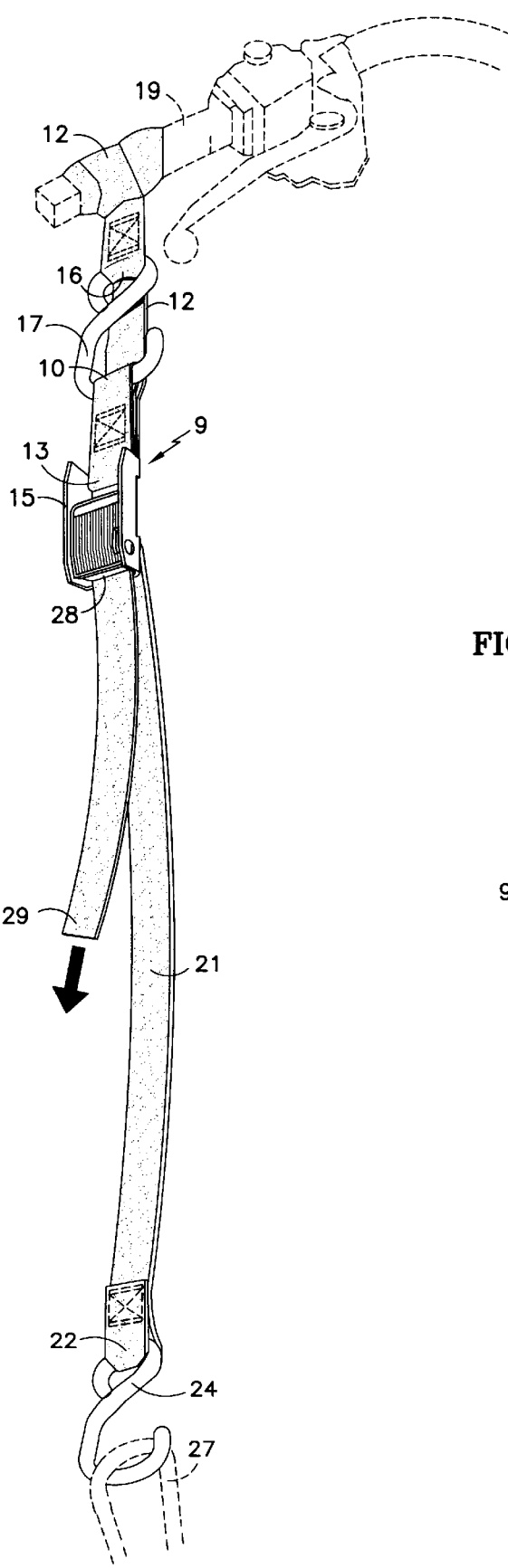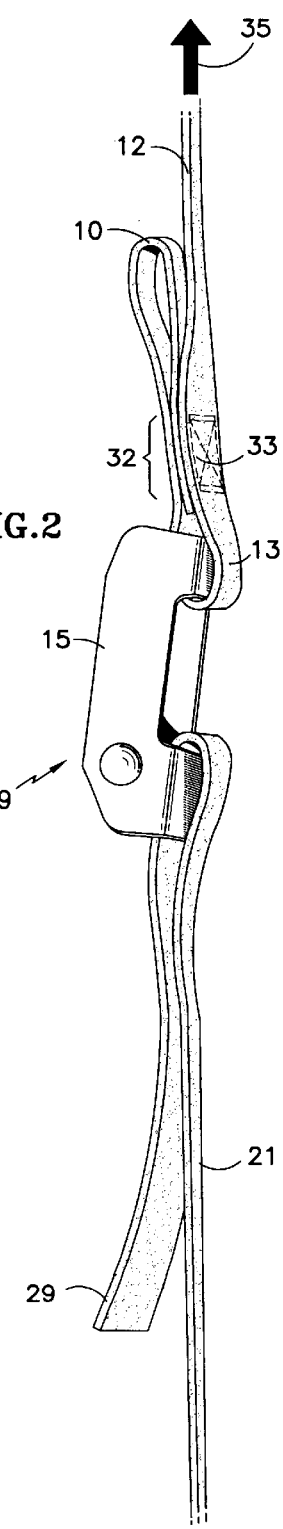

SOFT LOOP TIE-DOWN ASSEMBLY

TECHNICAL FIELD

This invention relates to a tie-down assembly of the kind typically having a cargo strap joined by a ratchet or cam buckle which has a loop that allows wrapping the soft strap around portions of articles to be secured, such as motorcycle handle bars, thereby avoiding metal to metal contact.

BACKGROUND ART

The use of tie-down straps with buckles is rampant. One typical application for tie-down straps is securing small vehicles such as motorcycles, "4-by-4s" and other off-road vehicles to truck or trailer bodies. Heretofore, the only way to secure such a vehicle with the cargo strap would be to engage it with a hook made of metal, which can slide easily, scratch and otherwise damage the article being secured. To overcome this, attempts were made to provide loops by simply folding the strap so as to form a bight, and stitching the strap together so as to preserve the bight as a loop. However, the tension in the strap pulls the stitching apart and breaks the loop open.

DISCLOSURE OF INVENTION

Objects of the invention include: provision of a cargo strap in which a metal hook can loop back and hook on the strap itself, rather than on the article being restrained; provision of an improved tie-down strap particularly suited to securing small vehicles in trucks or trailers; and provision of a cargo strap which avoids the necessity of a metal portion making contact with the article being restrained thereby.

This invention is predicated on the realization that a loop fashioned in a tie-down strap will withstand the rated loading of the strap provided the stitching forming the loop is perpendicular to the tension in the strap.

According to the present invention, a loop is formed in a tie-down strap by folding the tie-down strap so as to form a loop, the base of the loop being adjacent to elements of the tie-down strap through which tension is to be provided, there being three contiguous layers of strap at the base of the loop, all of said three layers being sewn together with stitching which is substantially perpendicular to the direction in which tension is applied in said tie-down strap.

According further to the invention, two loops are formed in the strap, with three contiguous layers of strap between said two loops stitched together. In further accord with the invention, one of the loops encompasses a portion of a strap-tightening, tensioning device, such as a buckle.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a perspective view of a tie-down strap with a cam buckle, having a soft loop of the invention as utilized to restrain the handle bar of a motorcycle.

FIG. 2 is a perspective view of the tie-down strap of FIG. 1, further illustrating formation of the soft loop.

MODES(S) FOR CARRYING OUT THE INVENTION

Figures 3, 4:
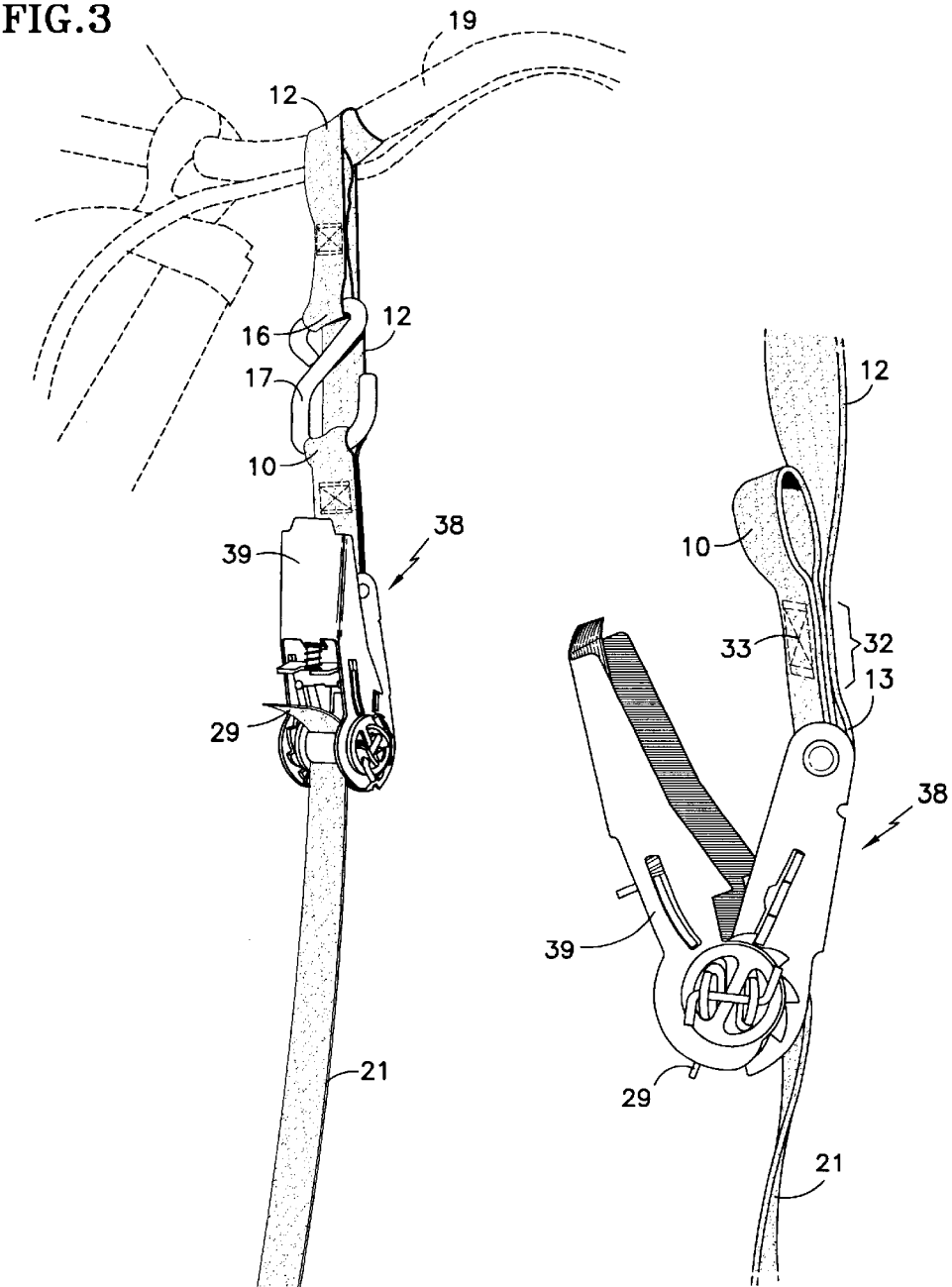
FIG. 3 is a perspective view of a tie-down strap employing a ratchet buckle, and having a soft loop of the invention utilized to restrain the handle bar of a motorcycle.
FIG. 4 is a perspective view of the tie-down strap of FIG. 3, further illustrating the formation of the soft loop.

Referring to FIG. 1, a tie-down strap 9, incorporating a soft loop 10 of the invention, includes a first strap 12 in which the loop is formed, said strap 12 including a loop 13 which constrains a cam buckle 15. The far end of the strap 12 has a third loop 16 constraining a hook 17 in the usual fashion. As shown, the strap 12 is wrapped about a handle bar 19 of a motorcycle, and then doubled back toward the buckle 15 with the hook 17 engaging the soft loop 10. A second strap 21 of the tie-down has a loop 22 in one end which constrains a hook 24 that may engage some form of anchor 27 on the structure to which the motorcycle is to be restrained (such as the bed of a truck or trailer). The strap 21 passes under the engaging jaw 28 of the cam buckle 15, the other end 29 of the strap 21 being free, and being the end upon which tension is applied in order to provide the desired tightness between the anchor 27 and the handle bars 19.

As shown most clearly in FIG. 2, the soft loop 10 is formed by doubling the strap 12 back on itself twice so as to provide an interloop region 32 where there are three contiguous layers of strap and where stitching 33, perpendicular to the direction 35 in which tension is applied in the strap 12, secures the three layers of strap together. The stitching will not be pulled loose by tension in the strap because the stitching is perpendicular to the direction 35 of tension in the strap 12, the thread itself is in sheer, rather than in tension, and all the thread shares the shear load.

In FIGS. 1 and 2, the end of the strap 12 is the inside layer in the region 33; it could be the outside layer, by forming the loop 10 with a bend reversed from that shown in the figures.

FIGS. 3 and 4 illustrate the soft loop of the invention being utilized in a tie-down 38 having a split axle ratchet buckle 39 of a known variety. The invention may be used with other tensioning buckles, including TSC and other over the top buckles, and it may be used with other tensioning devices, as should be apparent.

The nature of the hooks 17, 24 is irrelevant to the invention. As used herein, the term "hook" means both open hooks (as shown) and closed hooks, such as carabiners, and other devices for engaging anchors or loops.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A tie-down assembly comprising:

a pair of hooks;

a tensioning device; and first and second straps, each strap having a first end and a second end, the first end of each strap engaging a corresponding one of said hooks;

said second end of said first strap being fed through said tensioning device and adjustably positioned therein so as to determine the tension provided by said tie-down assembly;

a first bend near said second end of said second strap being through said tensioning device to thereby form a first loop which engages said tensioning device, a second bend in said second strap, closer to said second end of said second strap than said first bend, turning back toward said tensioning device so as to form a second loop, with three contiguous layers of said strap in a region between said two loops, said three layers of strap being stitched together in said region.

2. A tie-down subassembly comprising:

a hook;

a tensioning device; and a strap having a first end and a second end, the first end of said strap engaging said hook;

a first bend near said second end of said strap being through said tensioning device to thereby form a first loop which engages said tensioning device, a second bend in said strap, closer to said second end of said strap than said first bend, turning back toward said tensioning device so as to form a second loop, with three contiguous layers of said strap in a region between said two loops, said three layers of strap being stitched together in said region.

3. A tie-down assembly comprising:

a pair of hooks;

a tensioning device; and first and second straps, each strap having a first end and a second end, the first end of each of said straps engaging a corresponding one of said hooks;

the second end of said first strap being fed through said tensioning device and adjustably positioned therein so as to determine the tension provided by said tie-down assembly;

a pair of oppositely directed bends near said second end of said second strap, there being three contiguous layers of said second strap in a region between said two bends, said three layers being stitched together in said region so as to form two loops in said second strap, one of said loops in said second strap engaging said tensioning device.

4. A tie-down subassembly comprising:

a hook;

a tensioning device; and a strap having a first end and a second end, the first end of said strap engaging said hook;

a pair of oppositely directed bends near said second end of said strap, there being three layers of said strap in a region between said two bends, said three contiguous layers being stitched together in said region so as to form two loops in said strap, one of said loops in said strap engaging said tensioning device.

5. A tie-down assembly according to any of claims 1–4 wherein:

said tensioning device is a buckle.

6. A tie-down assembly according to claim 5 wherein:

said buckle is a cam buckle.

7. A tie-down assembly according to claim 5 wherein:

said buckle is a split axle ratchet buckle.

* * * * *